(No Model.) 2 Sheets—Sheet 1.
W. JARRELL.
SEED PLANTING MACHINE.
No. 582,067. Patented May 4, 1897.
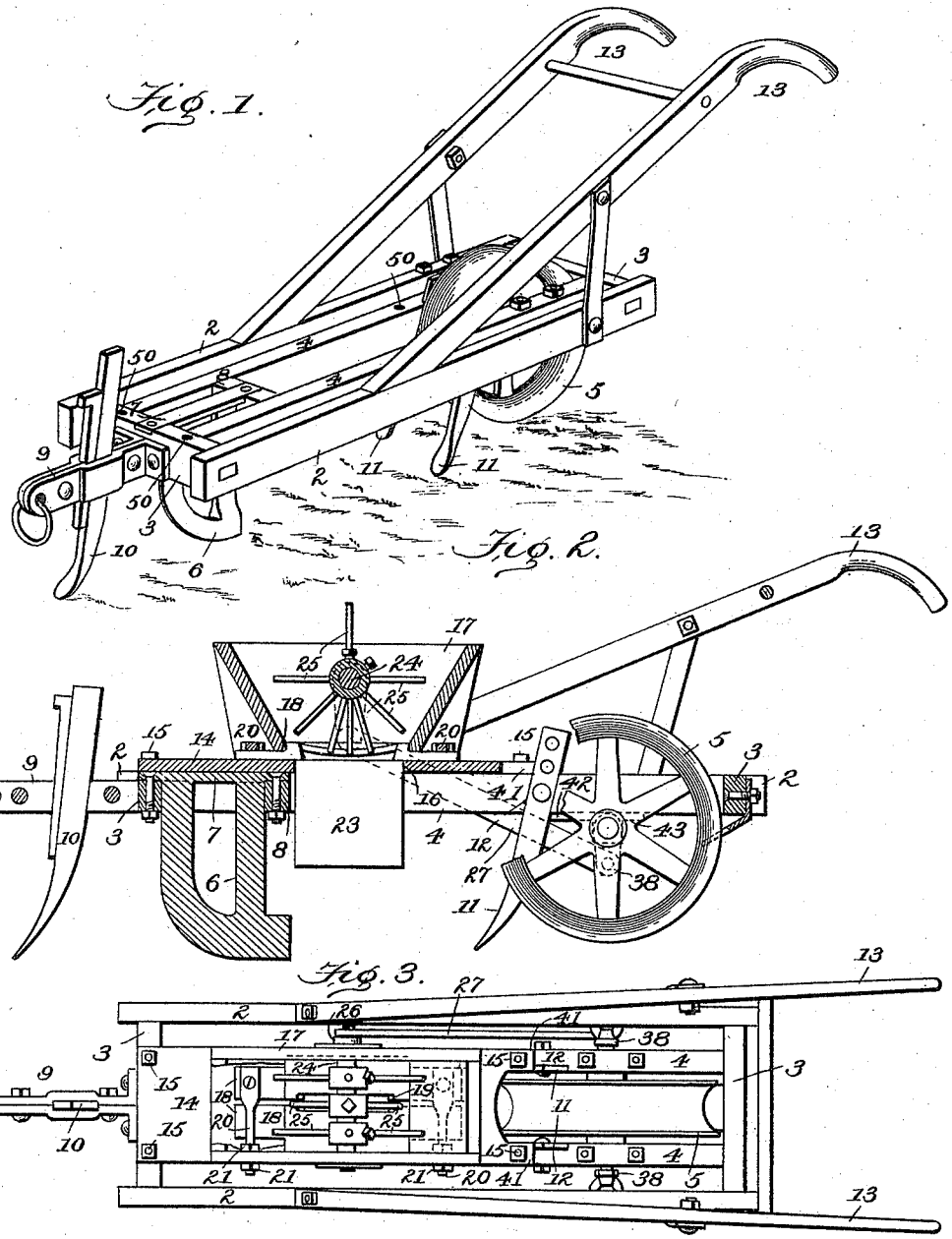
WITNESSES:
Edwin L. Bradford.
L. G. Marshall
INVENTOR
William Jarrell
BY
Johnson and Johnson
ATTORNEYS.

(No Model.) 2 Sheets—Sheet 2.

W. JARRELL.
SEED PLANTING MACHINE.

No. 582,067. Patented May 4, 1897.

WITNESSES:
Edwin L. Bradford
L. G. Marshall

INVENTOR
William Jarrell
BY Johnson and Johnson
ATTORNEYS.

UNITED STATES PATENT OFFICE.

WILLIAM JARRELL, OF LAVACA, ARKANSAS.

SEED-PLANTING MACHINE.

SPECIFICATION forming part of Letters Patent No. 582,067, dated May 4, 1897.

Application filed December 14, 1896. Serial No. 615,679. (No model.)

*To all whom it may concern:*

Be it known that I, WILLIAM JARRELL, a citizen of the United States, residing at Lavaca, in the county of Sebastian and State of Arkansas, have invented a new and useful Improvement in Seed-Planters having Interchangeable Dropping Attachments for Cotton and Corn, of which the following is a specification.

In the production of a planter which may be used for seed required to be deposited with a continuous flow, or with an intermittent flow for hills, I have provided a frame structure adapted for use with interchangeable planting attachments for cotton-seed with a continuous delivery and for corn and like seed with a delivery for hills. The same fastenings are used with these interchangeable attachments, and each attachment has its hopper and depositing-conduit suited to the kind of seed to be planted; and the particular matters which constitute my improvements I will point out in the claims concluding this specification.

My cotton and corn planter is illustrated in the accompanying drawings, in which—

Figure 4:
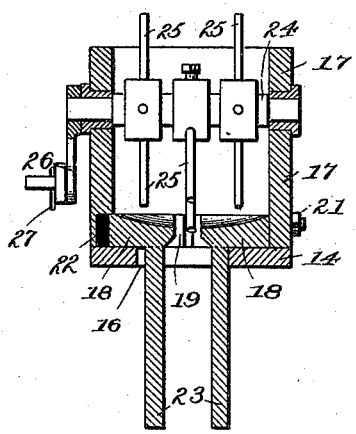
Figure 5:
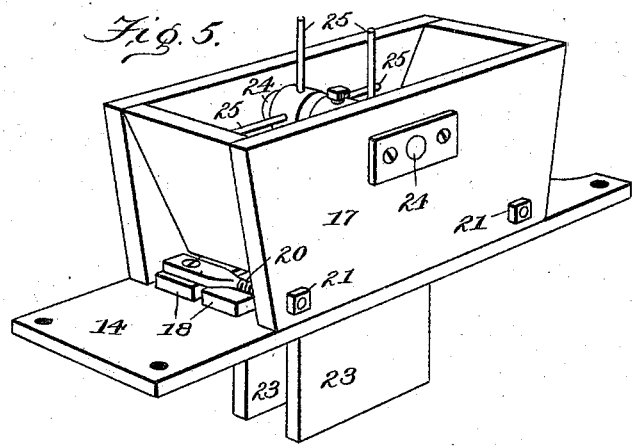
Figure 8:
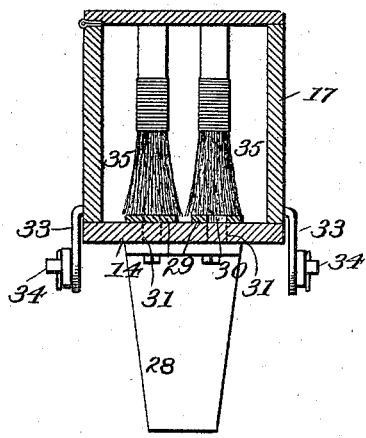
Figure 6:
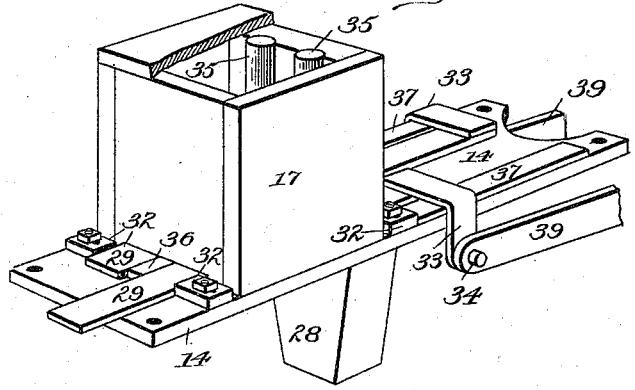
Figure 7:
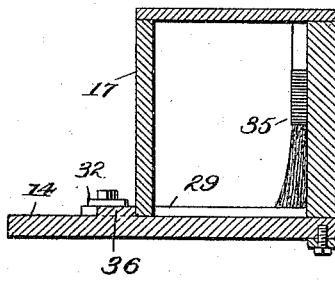

Figure 1 shows the machine structure adapted for use with interchangeable planting attachments for cotton-seed and for corn. Fig. 2 shows a vertical section of the same as used with the cotton-planting attachment. Fig. 3 is a top view of the same, and Fig. 4 is a cross-section taken through the hopper and its adjustable dropping-conduit. Fig. 5 shows in perspective the cotton-planting attachment. Fig. 6 shows in perspective the corn-planting attachment. Fig. 7 shows in longitudinal section the corn-planting attachment, and Fig. 8 shows the same in cross-section.

The frame of the planter is constructed of oblong longitudinal bars 2 2, connected by end cross-bars 3 3 and two inner longitudinal bars 4 4, between which at one end is mounted the supporting and covering wheel 5, which has a concave tread for covering the seed dropped in the furrow made by a plow or furrow-opener 6, secured between the inner bars at the front end of the frame. The plow or furrow-opener has the form of a runner made sharp for cutting its way into the ground and wedge-shaped at the heel and flat at the bottom for opening the furrows with a flat bottom. It has a horizontal cap or plate 7, the ends of which are mortised in the front cross-bar and in a cross-bar 8, connecting the two inner bars, and to these cross-bars a base-plate 14 is secured by bolts. A casting 9, projecting from and bolted to the front cross-bar, forms a short tongue and a support for a front furrow shovel-opener 10. This tongue-casting is preferably made of two parts bolted together, and in a mortise formed between them the shank of the shovel-opener is adjustably secured, preferably by a wedge. Any suitable form of shovel-opener may be used. At its end the tongue has a ring for the attachment of a singletree.

To the inner frame-bars at the front of and on each side of the supporting-wheel a shovel 11 is secured, adapted to throw the earth toward and to cover the furrow in advance of the wheel, which presses the earth in the furrow. The shanks of these coverers are fitted within seats formed by recesses 12, Fig. 3, on the sides (next to the wheel) of the inner bars, to which the shanks are adjustably secured by bolts, so that these shovels and the concave tread of the wheel cover and press the earth in the furrow. The seats for the shovel-shanks may be formed by mortises.

Handles 13 are secured to the outer frame-bars at the wheel end of the frame. Upon this frame is secured a planting attachment for cotton-seed, which is made interchangeable for a planting attachment for corn, whereby the one machine may be conveniently adapted for either use, and the means whereby such adaptation is effected I will now describe.

The interchangeable seed-dropping attachments are shown in Figs. 5 and 6, wherein each has an iron or wood base-plate 14, of identical form and size, which contains the dropping device suited for different seed and is adapted to fit upon the inner frame-bars in front of the supporting-wheel and be interchangeably secured to said bars by bolts 15 passing through identical holes at the corners of the base-plate into corresponding holes 50 in the said inner frame-bars, so that the same bolts are used for fastening the separate dropping attachments, whereby the dropping-conduit of each attachment will, when interchangeably used, stand from the under side of said base-plate between the furrow-opener and the covering-wheel, while upon the upper side of said base-plate is secured the hopper suited for the seed.

The machine shown in Figs. 2, 3, and 4 has the attachment for cotton-seed shown in Fig. 5, wherein it will be seen that the base-plate has a middle oblong opening 16, over and inclosing which the hopper 17 is secured. Forming the bottom of the hopper are two concave plates 18, between the continuous edges of which is an oblong opening 19 above that in the base-plate through which the cotton-seed is fed. One of these plates is fixed and the other is made adjustable in relation to the fixed one to vary the width of the dropping-opening to regulate the quantity of the seed to be planted. This adjustment is made by means of a screw-rod 20, attached to each end of the movable plate outside of the hopper and, passing through a hole in one side of the latter at each end thereof, has nuts 21 by which to adjust and set the movable plate, the said nuts being on the outer and inner sides of that side of the hopper through which the bolts pass, as in Fig. 3. For this adjustment of the movable plate it is fitted in a recess 22, Fig. 4, in the side of the hopper, so that the seed will not get behind the edge of the plate in adjusting it. Each of these hopper-bottom plates has a vertical plate 23 of a width equal to the length of the dropping-opening and which extends down through the opening in the base-plate and forms the conduit for the seed from the hopper. This conduit is open at its front and rear sides below the base-plate, and its side-forming plates depend from the hopper-plates. The adjustment of one of the latter to vary the width of the dropping-opening correspondingly governs the width of the conduit between the vertical plates. This conduit, formed only of two side plates preferably cast with and depending from and forming parts of the hopper-bottom plates, gives an adjustable and a fixed side of the conduit corresponding with the fixed and adjustable dropping-plates of the hopper, and the open conduit gives a better distribution to the seed in the furrow in continous planting, because the conduit is oblong in its cross-section and, being open at its ends, delivers the seed in a furrow in a flow from the long narrow hopper-opening, as in Fig. 4.

A shaft 24, mounted in the side walls of the hopper mediately of and above the dropping-opening, carries fingers 25, which operate with the concave bottom to keep the cotton-seed in a continuous outflow through the opening. A central row of these fingers operate within the dropping-opening and separate rows of fingers operate on the concave surface at each side of said opening to keep the seed free for continuous discharge. A crank-arm 26 on one end of this fingered shaft serves to receive an operatively-connected rod 27, as in Figs. 2 and 3.

To use the machine for planting corn, the attachment shown in Fig. 6 is substituted for that shown in Fig. 5, the same screw-bolts securing each in place. The base-plate of this corn-planting attachment has a box-like conduit 28 on its under side and a hopper 17 on its upper side. Upon the base-plate 14, and passing through the hopper side by side, are two sliding feed-bars 29 29, each of which is provided with one or more holes 30, Figs. 7 and 8, through which the corn is received from the hopper, carried outside of it, and dropped through an opening 31 in the base-plate and into the conduit. The dropping-slides are fitted to move between guides 32, adjustably secured to the base-plate by bolts in front of and at the rear sides of the hopper, and the stroke of these slides is sufficient to carry their dropping-holes into and out of the hopper. At their rear ends each slide has a downwardly-bent arm 33 in the space between the inner and outer frame-bars, each arm having a pin 34 at its lower end whereby they are operatively connected by rods of equal length.

That side of the hopper from which the slide carries the corn to deliver it into the conduit has the usual brushes 35 for evening the grain in the dropping-holes in the slides. These slides are reciprocated alternately with equal stroke, so that their dropping-holes are brought coincidently with the corresponding holes in the base-plate to deliver the seed into the conduit, which at its upper end incloses both openings in the base-plate for planting the corn in hills, as in Fig. 8.

Guides 36 36, which may be fastened to the front and rear sides of the hopper or integral with the base-plate, serve to separate the dropping-slides, while the bent arms of the slides ride upon ways 37 37, which may be secured to or integral with the base-plate, whereby the slides are kept true for reciprocal movement. The devices of each hopper attachment are operated by the supporting and covering wheel, the shaft of which has oppositely-placed cranks 38 38, to which are connected the rods 39 39, which connect the crank-pins 34 of the dropping-slides. For the cotton-planting attachment a longer connecting-rod 27 connects one of the wheel-cranks with the crank-arm of the hopper fingered shaft and imparts to it a rocking movement to effect a continuous discharge of the cotton-seed from the hopper.

The crank-operated rods may form a permanent part of the planting attachments, so that in applying the latter for use it is only required in interchanging them to remove the screw-bolts 15 and disconnect the operating rod or rods from the supporting wheel crank or cranks and in substituting the other attachment to secure it with the same screw-bolts and connect its crank-operated rod or rods with the crank or cranks of the wheel.

It will be seen that the crank-arm of the dropping part of the cotton-planting attachment hangs over the space between the inner and outer frame-bars, so that its operating-rod extends between these bars from the wheel-crank to the hopper crank-arm, and it will also be seen that the hopper crank-arm is longer than the wheel-crank, whereby only a rocking movement will be given to the fingered shaft of the hopper to work out the cotton-seed.

In the corn-planting attachment it is important that in driving the dropping-slides they should be prevented from being lifted from their seats on the base-plate, and for this purpose I provide these slides with the downward arms 33 with crank-pins at their lower ends, so that on the upward and forward throw of the wheel-cranks the connecting-rods will be brought in a horizontal position in forcing the slides forward and thus prevent them from being lifted, which would cause them to bind in the hopper, as shown in Figs. 6 and 7.

Referring to the covering-shovels, I support and brace them in their grooves or mortises 12 in the frame-bars by extensions 41 of the iron base-plate abutting against the front edges of the shovel-standards, as seen in Figs. 2 and 3, and by the flanges 42 of the wheel-shaft boxes 43, extended to abut against the rear edges of the said standards at the under side of the frame-bar, whereby the standards can be secured in the open-face recesses or mortises of the wooden frame-bars, so that there will be no crushing pressure upon the shoulders of the recess or in the mortise and no undue strain upon the securing-bolts for the standards.

The speed of the dropping devices is governed by the size of the wheel, and the slides may have double sets of dropping-holes, and they may be disposed in connection with the stroke of the slide, so as to plant in hills the desired distance apart, and while the dropping-plates have no connection with each other they deposit the seed in the same conduit and at points outside of the hopper, so that the working of the dropping-holes can be seen.

The front shovel opens a small furrow, the flat-bottom furrow-plow opens and smooths the furrow, causes the machine to run steady, and regulates the depth of the furrow into which the seed is deposited, covered by the shovels, and the earth pressed in the furrow by the wheel.

The concavity of the bottom-forming plates of the hopper gives a downward slope to the opening and directs the flow of the seed to the center of the conduit.

I claim as my improvement—

1. For planting seed, a frame having furrow opening and covering appliances, and supporting-wheel having oppositely-arranged cranks, interchangeable dropping attachments each composing a base-plate of identical form, each base-plate having a hopper, movable devices for dropping the seed therefrom, a conduit suited for the delivery of the seed, each base-plate provided with identical bolt-holes and nutted bolts entering corresponding holes in the frame, and rods operatively connecting the movable dropping devices with the wheel-cranks, as shown and described.

2. In a seed-planting machine, a frame having furrow-opening devices and a covering-wheel, in combination with a dropping attachment composed of a base-plate having a hopper, movable seed-dropping devices, and a conduit for delivering the seed and covering-shovels, the said base-plate having extensions abutting against the standards of said shovels on the upper side of the frame-bars, and the wheel bearing boxes having extensions abutting against said shovel-standard on the under side of said frame-bars, whereby the said standards are braced and supported within their seats.

3. In a seed-planting machine, a frame having furrow-opening devices, a supporting-wheel and covering-shovels, in combination with a seed-dropping attachment comprising a base-plate having a hopper, movable devices for dropping the seed and a delivery-conduit formed of two disconnected plates depending from and forming parts of corresponding hopper-plates between which the dropping-opening for the seed is formed, whereby the hopper-bottom opening and the conduit are formed by the disconnected plate parts.

4. In a seed-planting machine, a device for dropping cotton-seed consisting of a hopper, a fixed and a movable plate forming the bottom thereof and an oblong dropping-opening between them, each plate having a side branch depending and forming the hopper-conduit coincident with the dropping-opening, nutted screw-rods for adjustably connecting the movable hopper-plate with one side of the hopper, and a stirring device within the hopper operatively connected for continuous dropping of the seed, whereby to regulate the width of the hopper-opening and correspondingly the width of the dropping-conduit.

5. In a seed-planting machine, a device for dropping seed consisting of a base-plate having a hopper on its upper side and dropping-conduit on its under side, slides operating within said hopper having dropping-holes and seats upon said base-plate, adjustable and fixed guides for the slides, on said base-plate each slide having at its rear end a downwardly-bent arm having a crank-pin, rods connecting said slide-pins, and a supporting-wheel having right-angle cranks connecting said rods, the said slides operating to deliver the seed into the conduit outside of the hopper, as described.

In testimony whereof I have hereunto signed this specification in the presence of two subscribing witnesses.

WILLIAM JARRELL.

Witnesses:
D. F. JOINER,
C. E. MOORE.